(12) United States Patent
Lindow et al.

(10) Patent No.: US 7,795,371 B2
(45) Date of Patent: Sep. 14, 2010

(54) GRIND RESIN

(75) Inventors: David E. Lindow, Farmington Hills, MI (US); Mark P. Slawikowski, Brighton, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 499 days.

(21) Appl. No.: 11/853,080

(22) Filed: Sep. 11, 2007

(65) Prior Publication Data

US 2009/0069498 A1 Mar. 12, 2009

(51) Int. Cl.
*C08G 63/54* (2006.01)
*C08G 63/48* (2006.01)
*C08G 63/12* (2006.01)

(52) U.S. Cl. .................. 528/295.3; 528/295.5; 528/296; 523/500; 524/604

(58) Field of Classification Search .................. 523/500; 524/604; 528/295.3, 295.5, 296, 302
See application file for complete search history.

(56) References Cited

U.S. PATENT DOCUMENTS

| | | | |
|---|---|---|---|
| 3,498,940 A | 3/1970 | Laganis | |
| 4,410,687 A | 10/1983 | Schimmel et al. | |
| 4,791,168 A | 12/1988 | Salatin et al. | |
| 5,326,815 A | 7/1994 | Serdiuk et al. | |
| 5,334,650 A | 8/1994 | Serdiuk et al. | |
| RE34,730 E * | 9/1994 | Salatin et al. | 427/407.1 |
| 5,610,224 A | 3/1997 | DePue et al. | |
| 6,040,360 A * | 3/2000 | Menovcik et al. | 523/206 |
| 6,162,506 A | 12/2000 | Lettmann et al. | |
| 6,657,002 B2 | 12/2003 | Ramesh et al. | |
| 6,849,686 B2 | 2/2005 | Michalec et al. | |
| 7,005,473 B2 | 2/2006 | Ramesh et al. | |

* cited by examiner

*Primary Examiner*—Tae H Yoon

(57) ABSTRACT

A grind resin, a pigment dispersion, and a coating composition are provided. The grind resin comprises a reaction product of a dibasic acid, optionally a polybasic acid, a diol, optionally a polyol, and a fatty compound. The fatty compound has a fatty chain and two reactive groups reactive with at least one of the dibasic acid and the diol provided that ≦5% of all acid groups are provided by the polybasic acid and <20% of all hydroxyl groups are provided by the polyol. The reaction product is substantially free from branching comprising the reaction product of acid groups or hydroxyl groups and the dibasic acid, polybasic acid, diol, polyol, or fatty compound. The pigment dispersion comprises a pigment and the grind resin. The coating composition comprises a vehicle resin, the pigment, the grind resin, and a crosslinking agent reactive with the vehicle resin and/or the grind resin.

19 Claims, No Drawings

GRIND RESIN

BACKGROUND OF THE INVENTION

1. Field of the Invention

The present invention generally relates to grind resins for use in coating compositions. More specifically, the present invention relates to grind resins formulated to minimize color shift of a cured film formed from the coating composition.

2. Description of the Prior Art

Coating compositions are typically applied to substrates to form a cured film that provides the substrates with certain functional and aesthetic qualities, such as protection and color. Examples of substrates that are typically coated with such coating compositions are metal coils, which may be used to form roofing, siding, and rainwear for commercial and residential structures.

Coating compositions typically include resins, solvents, additives, and pigments, which impart color. A pigment dispersion may be used to incorporate the pigments into the coating compositions. The pigment dispersion typically comprises a pigment and a grind resin. The grind resin thoroughly disperses the pigment throughout the pigment dispersion.

A grind mill may be used to integrate the pigment into the grind resin. The grind mill typically integrates the pigment into the grind resin until a desired particle size of the pigment is achieved, and until the pigment is appropriately wetted by the grind resin.

Many prior art grind resins are known including, but not limited to, polyester-modified urethane grind resins, as disclosed in U.S. Pat. No. 3,498,940 to Laganis. Specifically, Laganis discloses a polyester-modified urethane grind resin comprising a reaction product of a dibasic acid, a dimer fatty acid, a diol, and a polyhydric alcohol containing at least three hydroxyl groups.

Many grind resins of the prior art, including those disclosed in Laganis, are inadequate when minimal color shift is desired. Color shift is an undesirable result in coating industries because of noticeable appearance changes in substrates after aging. As is known in the art, color shift is defined as a change in color of a cured film formed from a coating composition after aging over time as compared to a color of a cured film formed from the coating composition before aging and is measured by a spectrophotometer or colorimeter. Many grind resins of the prior art do not respond well to mechanical forces exerted by the grind mill when integrating the pigment and do not effectively wet the pigment to maintain the pigment dispersed throughout the pigment dispersion. Instead, many grind resins of the prior art cause the pigment dispersions to agglomerate or settle, resulting in poor stability and inadequate shelf life. Grind resins with poor stability contribute to color shift of cured films formed after coating compositions including the pigment dispersions are manufactured, applied to substrates, and cured.

Additionally, pigment dispersions comprising grind resins of the prior art may have unacceptable viscosities. Unacceptable viscosities inhibit the amount of pigment that can be integrated into the pigment dispersions. As a result, many grind resins of the prior art often require increased use of solvents and other additives, thereby increasing an overall volatile organic content of the pigment dispersions, which is also an undesirable result in coating industries.

Due to the inadequacies of the grind resins of the prior art, including those disclosed in Laganis, there remains an opportunity to provide a grind resin for use in coating compositions which does not suffer from the aforementioned inadequacies. More specifically, there remains an opportunity to provide a grind resin that effectively wets pigment, adequately disperses pigment throughout pigment dispersions, and minimizes color shift of cured films formed from coating compositions.

SUMMARY OF THE INVENTION AND ADVANTAGES

The present invention provides a grind resin, a pigment dispersion, and a coating composition. The grind resin comprises a reaction product of a dibasic acid, optionally a polybasic acid, a diol, optionally a polyol, and a fatty compound. The fatty compound has a fatty chain and two reactive groups reactive with at least one of the dibasic acid and the diol provided that less than or equal to 5% of all acid groups are provided by the polybasic acid and less than 20% of all hydroxyl groups are provided by the polyol. The reaction product is substantially free from branching comprising the reaction product of acid groups or hydroxyl groups and the dibasic acid, the polybasic acid, the diol, the polyol, or the fatty compound.

The pigment dispersion comprises a pigment and the grind resin. The coating composition comprises a vehicle resin, the pigment, the grind resin, and a cross-linking agent reactive with the vehicle resin and/or the grind resin.

The grind resin adequately disperses the pigment in the pigment dispersion. The grind resin also withstands mechanical forces exerted during grinding and wets the pigment to maintain the pigment dispersed throughout the pigment dispersion. The grind resin also maximizes the amount of pigment that can be integrated into the pigment dispersion. Further, the pigment dispersion comprising the grind resin has excellent stability and minimizes color shift of a cured film formed from the coating composition.

DETAILED DESCRIPTION OF THE INVENTION

A grind resin, a pigment dispersion, and a coating composition are provided. The grind resin of the present invention is typically used as a grind resin for the pigment dispersion and the coating composition. That is, the grind resin is typically used to disperse pigments throughout the pigment dispersion for use in the coating composition.

The coating composition of the present invention is typically applied to a substrate to provide the substrate with certain functional and aesthetic qualities, such as protection and color. Typically, the coating composition is used for coating substrates such as metal coils, which may be used to form roofing, siding, and rainwear for commercial and residential structures. However, it is to be appreciated that the coating composition of the present invention can have applications beyond coating metal coils such as, but not limited to, automotive coating applications.

The grind resin of the present invention comprises a reaction product of a dibasic acid, optionally a polybasic acid, a diol, optionally a polyol, and a fatty compound. It is to be appreciated that the grind resin may include other components as well, such as solvents and catalysts. Suitable dibasic acids, for purposes of the present invention, may include any known acid having two replaceable hydrogen atoms per molecule. Examples of dibasic acids that are suitable for the present invention are compounds having the general structure:

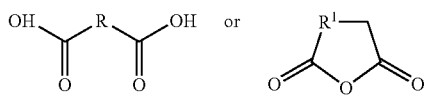

where R is selected from the group of aromatic groups, aliphatic groups, alicyclic groups and combinations thereof, and $R^1$ is selected from the group of aromatic groups, alicyclic groups, and combinations thereof. For example, R may be benzene, cylcohexane, or an aliphatic group having 4 to 6 carbon atoms, and $R^1$ may be benzene or cyclohexane where a ring of carbon atoms attaches to $R^1$. Specific examples of suitable dibasic acids include, but are not limited to, isophthalic acid, adipic acid, phthalic anhydride, hexahydrophthalic anhydride, and combinations thereof. A specific example of a dibasic acid that is suitable for the purposes of the present invention is isophthalic acid, commercially available from Eastman Chemical Company of Kingsport, Tenn.

Typically, the dibasic acid is present in an amount of from 30 to 50 parts by weight, more preferably from 30 to 40 parts by weight, and most preferably from 30 to 35 parts by weight based on 100 parts by weight of all components before reaction to form the reaction product. In other words, the weight basis is based on the total weight of the dibasic acid, optionally the polybasic acid, the diol, optionally the polyol, the fatty compound and any other component that reacts to form the reaction product. The dibasic acid is preferably present in the aforementioned amount to provide a sufficient amount of replaceable hydrogen atoms to form the reaction product.

Suitable polybasic acids, for purposes of the present invention, may include any known polybasic acid having from an average of from 2 to 4 acid groups per molecule. Examples of polybasic acids that are suitable for the present invention are compounds having the general structure $R^2(COOH)_3$ or $R^2(COOH)_4$, where $R^2$ is selected from the group of aromatic groups, aliphatic groups, alicyclic groups and combinations thereof. Specific example of suitable polybasic acids include, but are not limited to, trimellitic acid, 1,2,4,5-benzene tetracarboxylate dianhydride, and combinations thereof.

Typically, in the case where the polybasic acid has an average of from 3 to 4 acid groups per molecule, the polybasic acid is present in an amount of from 0 to 20 parts by weight, more preferably from 0.5 to 10, and most preferably 0.5 to 5 parts by weight based on 100 parts by weight of all components before reaction to form the reaction product. The polybasic acid is preferably present in the aforementioned amount to provide less than or equal to 5% of all acid groups to form the reaction product and to increase the molecular weight of the reaction product.

Suitable diols, for purposes of the present invention, may include any known alcohol having two hydroxyl groups per molecule. Examples of diols that are suitable for the present invention are compounds having the general structure:

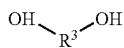

where $R^3$ is selected from the group of aliphatic groups having 4 to 6 carbon atoms, alicyclic groups, and combinations thereof. For example, in one embodiment $R^3$ may be cyclohexane. Specific examples of suitable diols include, but are not limited to, neopentyl glycol, 2-methyl 1,3-propanediol, 1,6 hexanediol, 1,4 cyclohexane dimethylol, and combinations thereof. Preferably, the diol includes neopentyl glycol. A specific example of a diol that is suitable for the purposes of the present invention is neopentyl glycol, commercially available from BASF Chemicals and Intermediates of Florham Park, N.J.

Typically, the diol is present in an amount of from 30 to 60 parts by weight, more preferably from 30 to 50 parts by weight based on 100 parts by weight of all components before reaction to form the reaction product. The diol is typically present in a stoichiometric excess, on a molar basis, of the dibasic acid and the fatty compound. That is, the diol is typically not a limiting reagent, but rather may be present in excess of the dibasic acid and the fatty compound to form the reaction product.

Suitable polyols, for purposes of the present invention, may include any known polyol having an average of from 2 to 4 hydroxyl groups per molecule. Examples of polyols that are suitable for the present invention are compounds having the general structure $R^4(OH)_3$ or $R^4(OH)_4$, where $R^4$ is selected from the group of aliphatic groups having 4 to 6 carbon atoms. Specific example of suitable polyols include, but are not limited to, trimethylol propane, trimethylol ethane, pentaerythritol, and combinations thereof. A specific example of a polyol that is suitable for the purposes of the present invention is trimethylol propane, commercially available from Perstorp Polyols, Inc. of Toledo, Ohio.

Typically, in the case where the polyol has an average of from 3 to 4 hydroxyl groups per molecule, the polyol is present in an amount of from 0 to 20 parts by weight, more preferably from 0.5 to 10, and most preferably 0.5 to 5 parts by weight based on 100 parts by weight of all components before reaction to form the reaction product. The polyol is preferably present in the aforementioned amount to provide less than 20% of all hydroxyl groups to form the reaction product and to increase the molecular weight of the reaction product.

Suitable fatty compounds, for purposes of the present invention, may include any compound having a fatty chain and two reactive groups reactive with at least one of the dibasic acid and the diol. More specifically, the two reactive groups may each be reactive with the acid groups provided by the dibasic and polybasic acid, which enables the fatty compound to be incorporated into the reaction product. In this case, the reactive groups may be replaceable hydroxyl groups of the fatty diol. Less than or equal to 5% of all acid groups are provided by the polybasic acid, in this case, so that the reaction product is substantially free from branching comprising the reaction product of acid groups or hydroxyl groups and the dibasic acid, the polybasic acid, the diol, the polyol, or the fatty compound, as set forth in further detail below. Alternatively, the two reactive groups may each be reactive with the diol. In this case, the reactive groups may be replaceable hydrogen atoms of the dibasic acid. Less than or equal to 20% of all hydroxyl groups are provided by the polyol, in this case, so that the reaction product is substantially free from branching comprising the reaction product of acid groups or hydroxyl groups and the dibasic acid, the polybasic acid, the diol, the polyol, or the fatty compound, as set forth in further detail below. Of course, it is to be appreciated that combinations of dibasic acids and diols may be used.

Examples of fatty compounds that are suitable for the present invention are compounds having the general structure:

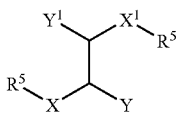

where X and $X^1$ are individually selected from the group of saturated and unsaturated $C_8$-$C_{14}$ chains, Y and $Y^1$ are individually selected from the group of saturated and unsaturated $C_8$ to $C_{14}$ chains, and $R^5$ is COOH or OH.

X, $X^1$, Y, and $Y^1$ in combination form a fatty chain that typically includes from 8 to 36, more preferably from 17 to 36, and most preferably 36 carbon atoms. The fatty chain typically includes at least 8 carbon atoms to provide the grind resin with sufficient length to effectively "wet", i.e. surround, pigments during integration into the pigment dispersion. Although X, $X^1$, Y, and $Y^1$ in combination do not have reactive groups that are reactive with the dibasic acid, the polybasic acid, the diol, or the polyol, the fatty chain may have unsaturation. That is, the fatty chain may include double bonds. It is to be appreciated that the fatty compound may also include isomers including cyclo- and aromatic-linked molecules, trimers or higher functional molecules, and combinations thereof. Such isomers may be present as impurities formed during manufacture of the fatty compound. Typically, the fatty compound is substantially free from impurities. That is, the fatty compound typically has less than 5% by weight impurities based on the total weight of the fatty compound.

Suitable fatty compounds, for purposes of the present invention, may be selected from the group of dimer fatty acids, cyclic fatty acids, aromatic fatty acids, trimer fatty acids, dimer fatty diols, cyclic fatty diols, aromatic fatty diols, trimer fatty diols, and combinations thereof. The fatty compound typically has from 18 to 60, preferably from 22 to 36 carbon atoms. A specific example of a fatty acid that is suitable for purposes of the present invention is Pripol 1012, a dimmer fatty acid, commercially available from Uniqema of Gouda, the Netherlands.

Typically, the fatty compound is present in an amount of from 5 to 30 parts by weight, preferably from 5 to 20 parts by weight based on 100 parts by weight of all components before reaction to form the reaction product.

The reaction product may be produced in the presence of a catalyst. Specific examples of suitable catalysts include butylstannoic acid, dibutyl tin oxide and other Lewis Acids, and combinations thereof. A specific example of a catalyst that is suitable for the purposes of the present invention is Fascat® 4100, a butylstannoic acid, commercially available from Arkema Inc. of Philadelphia, Pa.

Typically, the catalyst is present in an amount of from 0.01 to 1 parts by weight, preferably from 0.05 to 0.08 parts by weight based on 100 parts by weight of all components before reaction to form the reaction product. The catalyst is typically present in the aforementioned amount to increase the speed of reaction product formation.

As set forth above, the resulting reaction product of the dibasic acid, optionally the polybasic acid, the diol, optionally the polyol, and the fatty compound is substantially free from branching comprising the reaction product of acid groups or hydroxyl groups and the dibasic acid, the polybasic acid, the diol, the polyol, or the fatty compound. That is, the reaction product is a chain molecule that includes fatty chains pending therefrom and that is substantially free from the aforementioned type of branching. By "substantially free of branching", it is meant that the reaction product typically has, on average, less than two branches per molecule resulting from reaction of acid groups or hydroxyl groups and the dibasic acid, the polybasic acid, the diol, the polyol, or the fatty compound. The fatty chains of the reaction product effectively wet pigments by surrounding the pigments and the reaction product maintains pigments dispersed throughout the pigment dispersion.

Since the resulting reaction product is typically the chain molecule that is free from branching comprising the reaction product of acid groups or hydroxyl groups and the dibasic acid, the polybasic acid, the diol, the polyol, or the fatty compound, the reaction product typically minimizes increases in viscosity of the pigment dispersion resulting from loading of pigment into the pigment dispersion. Increases in viscosity of the pigment dispersion may occur with a conventional reaction product that includes branching, as set described herein, since the conventional reaction product may become entangled by the branching during reaction to form the conventional reaction product. The entanglement results in excessively high viscosity. The reaction product of the present invention minimizes branching as the reaction to form the reaction product propagates linearly, which thereby minimizes entanglement and the resulting increases in viscosity of pigment dispersions including the reaction product that occur as a result of the entanglement.

The grind resin may also include a catalyst. Suitable catalysts, for purposes of the present invention, may include metallic oxides and Lewis acids. Specific examples of suitable catalysts include dibutyl tin oxide, butyl stannoic acid, and combinations thereof. A specific example of a catalyst that is suitable for the purposes of the present invention is Fascat® 4100, commercially available from Arkema Inc. of Philadelphia, Pa.

Typically, the catalyst is present in an amount of from 0.01 to 1.0 parts by weight, more preferably from 0.04 to 0.09 parts by weight, and most preferably from 0.05 to 0.08 parts by weight based on 100 parts by weight of all components of the grind resin.

The grind resin may also include a solvent. Suitable solvents, for purposes of the present invention, may include aromatic hydrocarbon fluid. Specific examples of suitable solvents include heavy aromatic fluid, butyl cellosolve, and combinations thereof. A specific example of a solvent that is suitable for the purposes of the present invention is Aromatic 150 Fluid, a heavy aromatic fluid, commercially available from Exxon Mobil Corporation of Irving, Tex.

Typically, the solvent is present in an amount of from 5 to 70 parts by weight, more preferably from 10 to 50 parts by weight, and most preferably from 20 to 40 parts by weight based on 100 parts by weight of all components of the grind resin.

Typically, the reaction product is present in an amount of from 30 to 95 parts by weight, more preferably from 50 to 90 parts by weight, and most preferably from 60 to 80 parts by weight based on 100 parts by weight of all components of the grind resin.

As alluded to above, the pigment dispersion comprises the pigment and the grind resin. The pigment may include any known pigment, especially solid-color pigments. However, the pigment may also include effect pigments such as metal pigments and/or mica pigments. That is, the pigment dispersion may include inorganic pigments such as, for example, titanium dioxide, iron oxide, and carbon black; organic pigments; metal pigments such as, for example, aluminum and stainless steel bronzes; and nonmetal effect pigments such as, for example, pearl luster pigments. Typically, the pigment is present in an amount of from 30 to 70 parts by weight, preferably 30 to 50 parts by weight based on 100 parts by weight of all components in the pigment dispersion. The pigment is present in the aforementioned amounts, which are higher than conventional pigment dispersions, because the grind resin of the present invention allows for a greater amount of pigment to be dispersed in the pigment dispersion as compared to pigment dispersions that employ prior art grind resins. The grind resins of the present invention maximize the amount of pigment that is surrounded by the grind resin, and thus effectively wet the pigment.

The pigment dispersion may also include a solvent such as, for example, an aromatic hydrocarbon fluid. The solvent may be present in an amount from 20 to 60, preferably from 20 to 40, and most preferably from 20 to 35 parts by weight based on 100 parts by weight of the coating composition. A specific example of a solvent that is suitable for the purposes of the present invention is Aromatic 150 Fluid, commercially available from Exxon Mobil Corporation of Irving, Tex.

The pigment dispersion typically has a change in viscosity of less than or equal to 15% after aging for fourteen days. To measure the change in viscosity, the pigment dispersion is stirred in a container with a Cowles blade via a high speed air motor. The pigment dispersion is produced in equipment suitable for dispersing the pigment throughout the pigment dispersion. For example, the pigment dispersion may be ground in two passes through an Eiger mill to disperse the pigment throughout the pigment dispersion. The viscosity of the pigment dispersion is typically measured with a Krebs Unit viscometer at a pigment dispersion temperature of about 77° F. to provide a first viscosity value. The pigment dispersion is aged in the oven at about 120° F. for fourteen days and a second viscosity value is measured with the Krebs Unit viscometer at a pigment dispersion temperature of about 77° F. The first viscosity value is compared to the second viscosity value to determine the change in viscosity.

The pigment dispersion is typically stable after aging for fourteen days as evidenced by the absence of visible pigment settling upon a visual inspection and a manual scrape test on a bottom of the container with a spatula. To measure a stability of the pigment dispersion, the pigment dispersion may be stirred with the Cowles blade via the high speed air motor. The pigment dispersion may be ground in two passes through the Eiger mill to disperse the pigment throughout the pigment dispersion. The stability of the pigment dispersion is visually observed to check for visible coagulation, agglomeration, and settling to provide a first stability value. The pigment dispersion is aged in an oven at about 120° F. for fourteen days and a second stability value is visually observed. The first stability value is compared to the second stability value to determine whether or not the pigment dispersion is free from visible pigment settling after aging for fourteen days.

The coating composition of the present invention comprises a vehicle resin, the pigment, the grind resin, and a cross-linking agent reactive with the vehicle resin and/or the grind resin.

The vehicle resin is typically selected from the group of polyester resins, polyvinylidine difluoride resins, acrylic resins, and combinations thereof. The vehicle resin may be present in an amount of from 30 to 70, preferably 30 to 55, and most preferably 30 to 45 parts by weight based on 100 parts by weight of the coating composition.

The polyester resins are particularly preferred. A polyester resin that is suitable for purposes of the present invention typically has a number average molecular mass, $M_n$, of from 1,000 to 20,000, preferably from 1,500 to 4,500, and most preferably from 2,000 to 4,000 g/mol. The polyester resin also may have a weight average molecular mass, $M_w$, of from 2,000 to 40,000, preferably from 2,000 to 20,000, and most preferably from 2,000 to 10,000 g/mol. Furthermore, the polyester resin may have a hydroxyl number of from 5 to 150, preferably from 15 to 105, mg KOH/g, and an acid value of from 1 to 30, preferably from 3 to 15 mg KOH/g.

The polyester resin is typically made by the condensation reaction between polyols and polycarboxylic acids or corresponding anhydrides thereof. The polyols that are typically used to form the polyester resin contain from about 2 to 20 carbon atoms. Aliphatic polyols, particularly aliphatic diols containing from 2 to 10 carbon atoms, are preferred. Specific examples of suitable polyols include, but are not limited to, ethylene glycol, 1,2-propanediol, 1,3-propanediol, 1,3-propylene glycol, 1,4-butanediol, 1,4-butylene glycol, 1,5-pentanediol, glycerol, 1,2,3-butanetriol, 1,6-hexanediol, neopentyl glycol, diethylene glycol, dipropylene glycol, 2-methyl-1,3-propanediol, triethyleneglycol, 2,2,4-trimethylpentane-1,3-diol, 2,2-dimethyl-3-hydroxypropionate, 1,4-cyclohexanedimethanol, 1,4-cyclohexanediol, trimethylol ethane, trimethylol propane, pentaerythritol, and dipentaerythritol. Combinations of two or more of the polyols may be used.

The polycarboxylic acids typically used in the condensation reaction to make the polyester resin include, but are not limited to, adipic, methyladipic, malonic, sebacic, suberic, glutaric, fumaric, itaconic, malic, diglycolic, the 1,3- and 1,4-cyclohexanedicarboxylic acids, pimelic, azelaic, 1,12-dodecanedioic, maleic acid, maleic anhydride, succinic acid, succinic anhydride, and methylsuccinic and tetrapropenyl succinic acids and their anhydrides, and tetrahydrophthalic anhydride. Combinations of two or more of the polycarboxylic acids can be used. Also, examples of aromatic polycarboxylic acids which may be used in place of or in combination with the aliphatic or cycloaliphatic acids include phthalic acids and phthalic anhydride, isophthalic acid, terephthalic acid, benzophenone dicarboxylic acid, diphenic acid, 4,4-dicarboxydiphenyl ether, trimellitic acid, and 1,2,4,5-benzene tetracarboxylate dianhydride.

Also useful as the vehicle resin are polyvinylidine difluoride resins and acrylic resins are known in the art. Polyvinylidine resins are typically synthesized from the gaseous vinylidine difluoride monomer via a free radical polymerization process. Suitable acrylic resins may be derived from acrylic acid. To form the acrylic resin, acrylic acid is typically reacted with an alcohol to form a carboxylic ester. The carboxylic ester may combine with itself or monomers to form the acrylic resin.

As set forth above, the coating composition further includes the cross-linking agent reactive with the vehicle resin and/or the grind resin. The cross-linking agent is an agent which is reactive with the vehicle resin and/or the grind resin to establish a cured film. Typically, the cross-linking agent is present in an amount from 3 to 15, preferably from 4 to 8 parts by weight based on 100 parts by weight of the coating composition.

One example of a suitable cross-linking agent is a melamine formaldehyde resin. One example of a suitable melamine formaldehyde resin is a fully methylated melamine. As such, the melamine formaldehyde resin may include alkoxymethyl groups of the general formula:

where $R_1$ is an alkyl chain having from 1 to 20 carbon atoms. A specific example of a suitable fully methylated melamine for the purposes of this invention is hexamethoxymethyl melamine commercially available under the tradename Resimene® from Solutia of St. Louis, Mo.

Other cross-linking agents may also be suitable for purposes of the present invention. For example, the cross-linking agent may be other monomeric and polymeric melamine formaldehyde resins, including both partially and fully alkylated melamines, such as other non-fully methylated melamines, butylated melamines, and methylated/butylated melamines. The cross-linking agent can also be other aminoplasts including, but not limited to, urea resins such as methylol ureas and alkoxy ureas, for example, butylated urea formaldehyde resin. The cross-linking agent can also be isocyanate-functional materials including, but not limited to, monomeric and polymeric isocyanurates of isophorone diisocyanate and hexamethylene diisocyanate. A specific example of a polymeric isocyanurate of isophorone diisocyanate is Vestanat T1890E commercially available from Degussa Corporation of Piscataway, N.J.

The coating composition typically has excellent color stability. That is, the cured film formed from the coating composition exhibits minimal color shift after the coating composition has been exposed to accelerated aging for fourteen days. This is attributed at least in part to the pigment grind resin comprises the reaction product that is typically the chain molecule that is free from branching. This chain molecule is typically the reaction product of acid groups or hydroxyl groups and the dibasic acid, the polybasic acid, the diol, the polyol, or the fatty compound. The reaction product typically minimizes color shift of the cured film formed from the coating composition resulting from a lack of pigment wetting upon loading pigment into the pigment dispersion. Increases in color shift of the cured film formed from the coating composition may occur with the conventional reaction product that includes branching as set forth above, since the conventional reaction product may become entangled by the branching during reaction to form the conventional reaction product. The entanglement results in an inability to wet, i.e. surround, the pigment in the pigment dispersion. The reaction product of the present invention minimizes branching as the reaction to form the reaction product propagates linearly, which thereby minimizes entanglement and the resulting increases in color shift of the cured film formed from the coating composition including the reaction product that occur as a result of the entanglement.

In preparation for measuring color stability, a first mixing vessel, a second mixing vessel, and a Waring blender are provided. A paddle blade for mixing and a panel for draw down testing are also provided. To measure color stability, the entire coating composition is first mixed with the paddle blade and then divided in about half to form a first sample of the coating composition in the first mixing vessel and a second sample of the coating composition in the second mixing vessel. The first sample of the coating composition is blended in the Waring blender. The second sample of the coating composition is not blended in the Waring blender. The first sample and the second sample are drawn down side-by-side on the panel within 30 seconds after mixing the first sample in the Waring blender. The first sample forms a first cured film having a first color as defined by an $L^*$ value, an $a^*$ value, and a $b^*$ value as measured by a spectrophotometer according to a CIELAB color scale. The CIELAB color scale is a color-measuring system that is well known in the art. In the CIELAB color scale, the $L^*$ value is associated with a central vertical axis that represents lightness and darkness, the lightest (white) being $L^*=100$ and the darkest (black) being $L^*=0$. The $a^*$ value is associated with a red/green scale and the $b^*$ scale is associated with a yellow/blue scale. The $a^*$ value and the $b^*$ value have no numerical limits. A positive $a^*$ value is red and a negative $a^*$ value is green. A positive $b^*$ value is yellow and a negative $b^*$ value is blue.

Similarly, the second sample is drawn down to form a first standard cured film having a first standard color as defined by an $L^*_{s1}$ value, an $a^*_{s1}$ value, and a $b^*_{s1}$ value as measured by the spectrophotometer according to the CIELAB color scale. The first color of the first cured film formed from the coating composition is measured relative to the first standard color of the first standard cured film. A total change in lightness between the first color of the first cured film and the first standard color of the first standard cured film is denoted by $\Delta L^*_1$, which corresponds to the value of $(L^*-L^*_{s1})$. Similarly, a color shift between red and green between the first color of the first cured film and the first standard color of the first standard cured film is denoted by $\Delta a^*_1$, which corresponds to the value of $(a^*-a^*_{s1})$. A color shift between yellow and blue between the first color of the first cured film and the first standard color of the first standard cured film is denoted by $\Delta b^*_1$, which corresponds to the value of $(b^*-b^*_{s1})$.

The coating composition is then aged in the oven at about 120° F. for fourteen days. The first sample coating composition is then blended in the Waring blender to produce a third sample. A portion of the second sample is set aside to provide a fourth sample of the coating composition. The fourth sample is not blended in the Waring blender. The third sample and the fourth sample are drawn down side-by-side on the panel. The panel is baked in the oven at about 580° F. to reach a peak metal temperature of from about 400 to about 480° F. The third sample and the fourth sample are measured for color according to the CIELAB color scale using the spectrophotometer.

The third sample forms a third cured film having a third color as defined by an $L^*_3$ value, an $a^*_3$ value, and a $b^*_3$ value as measured by the spectrophotometer. The fourth sample forms a second standard cured film having a second standard color as defined by an $L^*_{s2}$ value, an $a^*_{s2}$ value, and a $b^*_{s2}$ value as measured by the spectrophotometer. The third color of the third cured film formed from the coating composition is measured relative to the second standard color of the second standard cured film. A total change in lightness between the third color of the third cured film and the second standard color of the second standard cured film is denoted by $\Delta L^*_2$, which corresponds to the value of $(L^*_3-L^*_{s2})$. Similarly, a color shift between red and green between the third color of the third cured film and the second standard color of the second standard cured film is denoted by $\Delta a^*_2$, which corresponds to the value of $(a^*_3-a^*_{s2})$. A color shift between yellow and blue between the third color of the third cured film and the second standard color of the second standard cured film is denoted by $\Delta b^*_2$, which corresponds to the value of $(b^*_3-b^*_{s2})$.

The first color of the first cured film formed from the coating composition is measured relative to the third color of the third cured film. A total change in lightness between the first color of the first cured film and the third color of the third cured film is denoted by $\Delta L^*$, which corresponds to the absolute value of $(\Delta L^*_1-\Delta L^*_2)$. Similarly, a color shift between red and green between the first color of the first cured film and the third color of the third cured film is denoted by $\Delta a^*$, which corresponds to the absolute value of $(\Delta a^*_1-\Delta a^*_2)$. A color shift between yellow and blue between the first color of the first cured film and the third color of the third cured film is denoted by $\Delta b^*$, which corresponds to the absolute value of $(\Delta b^*_1-\Delta b^*_2)$.

The color of the cured film formed from the coating composition of the present invention typically varies minimally after aging for fourteen days. That is, the value of $|(\Delta L^*_1 - \Delta L^*_2)|$, the value of $|(\Delta a^*_1 - \Delta a^*_2)|$, and the value of $|(\Delta b^*_1 - \Delta b^*_2)|$ of the cured film formed from the coating composition comprising the pigment dispersion of the present invention are respectively less than 0.30, preferably less than 0.25. Stated another way, the value of $\Delta L^*$, the value of $\Delta a^*$, and the value of $\Delta b^*$ of the cured film formed from the coating composition comprising the pigment dispersion of the present invention are respectively less than 0.30 and preferably less than 0.25.

The following examples are meant to illustrate the present invention and are not to be viewed in any way as limiting to the scope of the present invention.

EXAMPLES

Example 1

Grind Resin

In preparation for providing the grind resin, an auger, a reaction vessel with an agitator, a fractionator having a condenser and a decanter, a thindown vessel, and a filter press are provided. Diol A, Fatty Compound A, Dibasic Acid A, Dibasic Acid B, Dibasic Acid C, and Catalyst A, as described in further detail below, are loaded to the reaction vessel via the auger. The reaction vessel is purged with nitrogen and heated to 225° C. At approximately 150° C., a reaction between Diol A, Fatty Compound A, Dibasic Acid A, Dibasic Acid B, and Dibasic Acid C begins to generate a reaction product and steam. The steam rises up the fractionator and carries unreacted glycol as an azeotrope. The fractionator is maintained at a temperature of between 98 and 100° C. so that glycol separates from the steam and falls back to the reaction vessel. When the reaction product inside the reaction vessel reaches 225° C. and the temperature of the fractionator drops below 90° C., the fractionator is by-passed so that the reaction vessel refluxes to the condenser. The reaction vessel is then sparged with nitrogen to move the reaction to completion. The reaction product is monitored every 30 to 60 minutes until an acid number is less than 15 and viscosity is U-W, as measured by a Gardner-Holdt bubble tube viscometer at 25° C. The reaction product is then cooled and quenched with Solvent A. The reaction product is dropped to the thindown vessel and adjusted with Solvent A. The reaction product is filtered and packaged for distribution.

The specific amounts of each component in the grind resin are indicated below in Table 1, wherein all amounts are in parts by weight based on 100 parts by weight of all components. The specific amounts of each component in the pigment dispersion are indicated below in Table 2, wherein all amounts are in parts by weight based on 100 parts by weight of the pigment dispersion. The specific amounts of each component in the grand resin are indicated below in Table 1, wherein all amounts are in parts by weight based on 100 parts by weight of all components before reaction of the dibasic acid, the diol, and the fatty compound in the presence of the catalyst.

TABLE 1

| Component | Example 1 |
| --- | --- |
| Diol A | 29.281 |
| Fatty Compound A | 6.621 |
| Dibasic Acid A | 15.428 |
| Dibasic Acid B | 5.032 |

TABLE 1-continued

| Component | Example 1 |
| --- | --- |
| Dibasic Acid C | 12.778 |
| Catalyst A | 0.062 |
| Solvent A | 30.798 |
| Total | 100.000 |

Diol A is neopentyl glycol.
Fatty Compound A is Pripol 1012, commercially available from Uniqema of Gouda, the Netherlands.
Dibasic Acid A is isophthalic acid.
Dibasic Acid B is adipic acid.
Dibasic Acid C is phthalic anhydride.
Catalyst A is Fascat® 4100, commercially available from Arkema of Philadelphia, Pa.
Solvent A is Aromatic 150 Fluid, commercially available from Exxon Mobil Corporation of Irving, Tex.

The grind resin formed in Example 1 is substantially free from branching resulting from reaction of acid or hydroxyl groups and the dibasic acid, polybasic acid, diol, polol and fatty compound.

Example 2

Pigment Dispersion

A pigment dispersion of the present invention is produced by combining the grind resin of Example 1, Solvent A, and Pigment A. Prior to combination, a mixing vessel, a Cowles blade, and a high speed air motor are provided. An Eiger mill is provided for grinding Pigment A in the grind resin. The grind resin of Example 1, Solvent A, and Pigment A are added to the mixing vessel and mixed with the Cowles blade via the high speed motor for one hour to form the pigment dispersion. The pigment dispersion is passed through the Eiger mill twice.

The specific amounts of each component in the pigment dispersion are indicated below in Table 2, wherein all amounts are in parts by weight based on 100 parts by weight of the pigment dispersion.

TABLE 2

| Component | Example 2 |
| --- | --- |
| Grind Resin of Ex. 1 | 37.25 |
| Solvent A | 11.73 |
| Pigment A | 51.02 |
| Total | 100.00 |

Pigment A is Ishihara TY300, commercially available from Ishihara Corporation of San Francisco, Calif.

The viscosity of the pigment dispersion is measured by a Krebs Unit viscometer at a pigment dispersion temperature of 77° F. The pigment dispersion is aged in an oven at 120° F. for fourteen days. The viscosity of the pigment dispersion after aging is measured by a Krebs Unit viscometer at a pigment dispersion temperature of 77° F. The viscosity of the pigment dispersion before and after aging is listed in Table 3.

The stability of the pigment dispersion is measured via visual inspection. The pigment dispersion is free of visible coagulation, agglomeration, and settling. The pigment dispersion is aged in an oven at 120° F. for fourteen days. The stability of the pigment dispersion after aging is also measured via visual inspection. The stability of the pigment dispersion before and after aging, as well as viscosity before and after aging, is listed in Table 3.

TABLE 3

| Pigment Dispersion | Viscosity (KU) | Stability |
|---|---|---|
| Day 1 | 76.2 | Acceptable |
| Day 15 | 68 | Acceptable |

Examples 3-5

Coating Compositions

A coating composition of the present invention is prepared. In preparation for preparing the coating composition, a first mixing vessel, a second mixing vessel, and a Waring blender are provided. A panel for draw down testing is also provided.

To prepare the coating compositions of Examples 3-5, Base A and Pigment Dispersions A-D are combined in the amounts as set forth in Table 4 in the first mixing vessel and stirred at high speed with the Cowles blade to form a first sample of the coating composition of each Example.

TABLE 4

| Component | Example 3 | Example 4 | Example 5 |
|---|---|---|---|
| Base A (g) | 110.767 | 110.767 | 110.767 |
| Pigment Dispersion A (g) |  | 14.77 |  |
| Pigment Dispersion B (g) | 7.77 | 7.77 |  |
| Pigment Dispersion C (g) | 14.77 |  | 14.77 |
| Pigment Dispersion D (g) |  |  | 7.779 |

Base A is a combination of a polyester resin, hexamethoxymethyl melamine commercially available under the tradename Resimene® from Solutia of St. Louis, Mo., and Aromatic 150 Fluid, commercially available from Exxon Mobil Corporation of Irving, Tex.

Pigment Dispersion A is a white pigment dispersion comprising the grind resin of Example 1 and titanium dioxide pigment, commercially available from Dupont of Wilmington, Del.

Pigment Dispersion B is a yellow pigment dispersion comprising the grind resin of Example 1 and antimony nickel titanate pigment, commercially available from Ishihara Corporation of Osaka, Japan.

Pigment Dispersion C is a green pigment dispersion comprising a polyester grind resin and phthalo green pigment, commercially available from BASF AG of Ludwigshafen, Germany.

Pigment Dispersion D is a yellow pigment dispersion comprising a polyester grind resin and antimony nickel titanate pigment, commercially available from Ishihara Corporation of Ishihara Corporation of Osaka, Japan.

The conventional polyester grind resin used in Pigment Dispersions C and D is a proprietary BASF resin having an acid number from 5 to 10 mgKOH/g solids, a hydroxyl number of from 27 to 33 mgKOH/g solids. The conventional grind resin used in Pigment Dispersions C and D is branched.

In Examples 3-5, half of the first sample of the coating composition is poured into the second mixing vessel to form a second sample of the coating composition. The first sample of the coating composition in the first mixing vessel is blended in the Waring blender. The second sample of the coating composition is not blended in the Waring blender. The first sample and the second sample are drawn down side-by-side on the panel within 3 minutes. The panel is baked in an oven at about 580° F. to reach a peak metal temperature of from about 400 to about 480° F. The first sample and the second sample are measured for color according to a CIELAB color scale using a spectrophotometer.

The first sample forms a first cured film having a first color as defined by an L* value, an a* value, and a b* value as measured by the spectrophotometer. The second sample forms a first standard cured film having a first standard color as defined by an $L^*_{s1}$ value, an $a^*_{s1}$ value, and a $b^*_{s1}$ value as measured by the spectrophotometer. The first color of the first cured film formed from the coating composition is measured relative to the first standard color of the first standard cured film. A total change in lightness between the first color of the first cured film and the first standard color of the first standard cured film is denoted by $\Delta L^*_1$, which corresponds to the value of $(L^*-L^*_{s1})$. Similarly, a color shift between red and green between the first color of the first cured film and the first standard color of the first standard cured film is denoted by $\Delta a^*_1$, which corresponds to the value of $(a^*-a^*_{s1})$. A color shift between yellow and blue between the first color of the first cured film and the first standard color of the first standard cured film is denoted by $\Delta b^*_1$, which corresponds to the value of $(b^*-b^*_{s1})$.

The first sample is aged for fourteen days in the oven at about 120° F. The first sample of the coating composition in the first mixing vessel is blended in the Waring blender to produce a third sample. A portion of the second sample is set aside to provide a fourth sample of the coating composition. The fourth sample is not blended in the Waring blender. The third sample and the fourth sample are drawn down side-by-side on the panel. The panel is baked in the oven at about 580° F. to reach a peak metal temperature of from 400 to 480° F. The third sample and the fourth sample are measured for color according to the CIELAB color scale using the spectrophotometer.

The third sample forms a third cured film having a third color as defined by an $L^*_3$ value, an $a^*_3$ value, and a $b^*_3$ value as measured by the spectrophotometer. The fourth sample forms a second standard cured film having a second standard color as defined by an $L^*_{s2}$ value, an $a^*_{s2}$ value, and a $b^*_{s2}$ value as measured by the spectrophotometer. The third color of the third cured film formed from the coating composition is measured relative to the second standard color of the second standard cured film. A total change in lightness between the third color of the third cured film and the second standard color of the second standard cured film is denoted by $\Delta L^*_2$, which corresponds to the value of $(L^*_3-L^*_{s2})$. Similarly, a color shift between red and green between the third color of the third cured film and the second standard color of the second standard cured film is denoted by $\Delta a^*_2$, which corresponds to the value of $(a^*_3-a^*_{s2})$. A color shift between yellow and blue between the third color of the third cured film and the second standard color of the second standard cured film is denoted by $\Delta b^*_2$, which corresponds to the value of $(b^*_3-b^*_{s2})$.

The color of the cured film formed from the coating compositions of Example 3 and Example 4 typically varies minimally as compared to the color of the cured film formed from the coating composition of Example 5 that is free from the pigment dispersion of Example 2 after aging for fourteen days. That is, as summarized in Table 5, the value of $|(\Delta L^*_1-\Delta L^*_2)|$, the value of $|(\Delta a^*_1-\Delta a^*_2)|$, and the value of $|(\Delta b^*_1-\Delta b^*_2)|$ of the cured film formed from the coating compositions of Examples 3 and 4 comprising the pigment dispersion of Example 2 are respectively less than or equal to 0.25.

Stated another way, the value of $\Delta L^*$, the value of $\Delta a^*$, and the value of $\Delta b^*$ of the cured film formed from the coating composition comprising the pigment dispersion of Example 2 are respectively less than or equal to 0.25.

The color values of the coating compositions of Examples 3-5 are listed in Table 5.

TABLE 5

| Color Value | Example 3 | Example 4 | Example 5 |
|---|---|---|---|
| Day 1 | | | |
| $\Delta L^*_1$ | +0.47 | −0.23 | −0.21 |
| $\Delta a^*_1$ | −0.91 | +0.20 | +0.17 |
| $\Delta b^*_1$ | +0.17 | −0.24 | −0.25 |
| Day 15 | | | |
| $\Delta L^*_2$ | −0.19 | −0.02 | −0.25 |
| $\Delta a^*_2$ | +0.01 | −0.03 | +0.20 |
| $\Delta b^*_2$ | −0.16 | −0.05 | −0.23 |
| Change from Day 1 to Day 15 | | | |
| $\Delta L^*$ | 0.66 | 0.21 | 0.04 |
| $\Delta a^*$ | 0.92 | 0.23 | 0.03 |
| $\Delta b^*$ | 0.33 | 0.19 | 0.02 |

ANALYSIS OF RESULTS

As is apparent through the physical properties of a pigment dispersion comprising the grind resin of the present invention, as illustrated by Example 2, the pigment dispersion has a change in viscosity of less than or equal to 15% after aging for fourteen days. Similarly, after aging for fourteen days, the pigment dispersion of the present invention is free of visible coagulation, agglomeration, and settling. Thus, the grind resin of the present invention effectively wets and disperses the pigment to keep the pigment in suspension. Consequently, the pigment dispersions comprising the grind resin of the present invention are more suitable than conventional pigment dispersions comprising conventional grind resins for many applications that require effective pigment dispersion with minimal color shift of cured films formed from coating compositions including the pigment dispersions.

As is apparent through comparison of the physical properties of a coating composition comprising only the grind resin of the present invention, as illustrated by Examples 4, to the physical properties of the coating composition comprising a conventional grind resin, and the grind resin of the present invention, as illustrated by Example 4, to the physical properties of the coating composition comprising both the conventional grind resin and the grind resin of the present invention, as illustrated by Example 3, the value of $\Delta L^*$, $\Delta a^*$, and $\Delta b^*$ of the cured film formed from the coating composition comprising only the grind resin of the present invention are respectively less than 0.05. Stated another way, the value of $|\Delta L^*_1 - \Delta L^*_2|$, the value of $|\Delta a^* - \Delta a^*_2|$, and the value of $|\Delta b^* - \Delta b^*|$, of the cured film formed only from the coating composition comprising only the grind resin of the present invention are respectively less than 0.05. In contrast, as illustrated by Example 3, the value of $\Delta L^*$ and the value of $\Delta a^*$, and the value of $\Delta b^*$ of the cured film formed from the coating composition comprising both the conventional grind resin and the grind resin of the present invention are respectively greater than 0.05 but less than 0.25. Therefore, the coating composition of the present invention exhibits less color shift as represented by $\Delta L^*$, $\Delta a^*$, and $\Delta b^*$, as compared to coating compositions including conventional grind resins. The grind resin of the present invention minimizes color shift of the cured film formed from the coating composition. Consequently, coating compositions comprising the grind resin of the present invention are more suitable than conventional coating compositions comprising conventional grind resins for many applications that require minimal color shift of the cured film.

Similarly, as is apparent through comparison of the physical properties of the coating composition comprising the grind resin of the present invention, as illustrated by Examples 3-4, to the physical properties of the coating composition comprising only the the conventional grind resin, as illustrated by Example 5, the value of $\Delta L^*$, the value of $\Delta a^*$, and the value of $\Delta b^*$ of the cured film formed from the coating composition comprising the grind resin of the present invention are respectively less than 0.25. Stated another way, the value of $|(\Delta L^*_1 - \Delta L^*_2)|$, the value of $|(\Delta a^*_1 - \Delta a^*_2)|$, and the value of $|(\Delta b^*_1 - \Delta b^*_2)|$ of the cured film formed from the coating composition comprising the grind resin of the present invention are respectively less than 0.25. In contrast, as illustrated by Example 5, the value of $\Delta L^*$, the value of $\Delta a^*$, and the value of $\Delta b^*$ of the cured film formed from the coating composition comprising only the conventional grind resin are respectively greater than 0.30. Therefore, the coating composition of the present invention exhibits minimal color shift, as represented by $\Delta L^*$, $\Delta a^*$, and $\Delta b^*$ as compared to coating compositions including conventional grind resins. The grind resin of the present invention minimizes color shift of the cured film formed from the coating composition. Consequently, coating compositions comprising the grind resin of the present invention are more suitable than conventional coating compositions comprising conventional grind resins for many applications that require minimal color shift of the cured film.

Obviously, many modifications and variations of the present invention are possible in light of the above teachings. The invention may be practiced otherwise than as specifically described within the scope of the appended claims.

The invention claimed is:

1. A grind resin comprising a reaction product of:
   (a) a dibasic acid;
   (b) optionally a polybasic acid;
   (c) a diol;
   (d) optionally a polyol; and
   (e) a fatty compound having a fatty chain and two reactive groups reactive with at least one of said dibasic acid and said diol;
   provided that less than or equal to 5% of all acid groups are provided by said polybasic acid, when present, and provided that less than 20% of all hydroxyl groups are provided by said polyol, when present;
   wherein said fatty compound is present in an amount of from 5 to 20 parts by weight based on 100 parts by weight of all components before reaction to form said reaction product; wherein said dibasic acid is present in an amount of from 30 to 40 parts by weight based on 100 parts by weight of all components before reaction to form said reaction product;
   wherein said reaction product is substantially free from branching comprising the reaction product of acid groups or hydroxyl groups and components (a), (b), (c), (d), or (e).

2. A grind resin as set forth in claim 1 wherein said fatty compound has from 18 to 60 carbon atoms.

3. A grind resin as set forth in claim 2 wherein said fatty compound has from 22 to 36 carbon atoms.

4. A grind resin as set forth in claim 1 wherein said fatty compound is selected from the group of dimer fatty acids, cyclic fatty acids, aromatic fatty acids, trimer fatty acids, and combinations thereof.

5. A grind resin as set forth in claim 1 wherein said fatty compound is selected from the group of dimer fatty diols, cyclic fatty diols, aromatic fatty diols, trimer fatty diols, and combinations thereof.

6. A grind resin as set forth in claim 1 wherein said dibasic acid is selected from the group of isophthalic acid, phthalic anhydride, adipic acid, hexahydrophthalic anhydride, and combinations thereof.

7. A grind resin as set forth in claim 1 wherein said polybasic acid has an average of from 2 to 4 acid groups per molecule.

8. A grind resin as set forth in claim 1 wherein said diol is selected from the group of neopentyl glycol, 2-methyl 1,3-propanediol, 1,6 hexanediol, 1,4 cyclohexane dimethol, and combinations thereof.

9. A grind resin as set forth in claim 1 wherein said diol is present in a stoichiometric excess on a molar basis.

10. A grind resin as set forth in claim 1 wherein said polyol has an average of from 2 to 4 hydroxyl groups per molecule.

11. A grind resin as set forth in claim 1 wherein said reaction product has an average of less than two branches per molecule resulting from reaction of acid groups or hydroxyl groups and said dibasic acid, said polybasic acid, said diol, said polyol, or said fatty compound.

12. A pigment dispersion for use in a coating composition comprising:
a pigment; and
a grind resin comprising a reaction product of:
(a) a dibasic acid;
(b) optionally a polybasic acid;
(c) a diol;
(d) optionally a polyol; and
(e) a fatty compound having a fatty chain and two reactive groups reactive with at least one of said dibasic acid and said diol;
provided that less than or equal to 5% of all acid groups are provided by said polybasic acid, when present, and provided that less than 20% of all hydroxyl groups are provided by said polyol, when present;
wherein said fatty compound is present in an amount of from 5 to 20 parts by weight based on 100 parts by weight of all components before reaction to form said reaction product; wherein said dibasic acid is present in an amount of from 30 to 40 parts by weight based on 100 parts by weight of all components before reaction to faun said reaction product;
wherein said reaction product is substantially free from branching comprising the reaction product of acid groups or hydroxyl groups and components (a), (b), (c), (d), or (e).

13. A pigment dispersion as set forth in claim 12 wherein said fatty compound has from 18 to 60 carbon atoms.

14. A pigment dispersion as set forth in claim 12 wherein said fatty compound has from 22 to 36 groups per molecule.

15. A pigment dispersion as set forth in claim 12 wherein the pigment is present in an amount of from 30 to 70 parts by weight based on 100 parts by weight of all components in said pigment dispersion.

16. A pigment dispersion as set forth in claim 12 having a change in viscosity of less than or equal to 15% after aging for fourteen days.

17. A pigment dispersion as set forth in claim 12 wherein the reaction product comprising the grind resin has an average of less than two branches per molecule resulting from reaction of acid groups or hydroxyl groups and said dibasic acid, said polybasic acid, said diol, said polyol, or said fatty compound.

18. A coating composition comprising:
a vehicle resin;
a pigment dispersion comprising:
a pigment; and
a grind resin comprising a reaction product of:
(a) a dibasic acid;
(b) optionally a polybasic acid;
(c) a diol;
(d) optionally a polyol; and
(e) a fatty compound having a fatty chain and two reactive groups reactive with at least one of said dibasic acid and said diol;
provided that less than or equal to 5% of all acid groups are provided by said polybasic acid, when present, and provided that less than 20% of all hydroxyl groups are provided by said polyol, when present;
wherein said fatty compound is present in an amount of from 5 to 20 parts by weight based on 100 parts by weight of all components before reaction to form said reaction product;
wherein said dibasic acid is present in an amount of from 30 to 40 parts by weight based on 100 parts by weight of all components before reaction to form said reaction product; and
a cross-linking agent reactive with said vehicle resin and/or said grind resin;
wherein said reaction product is substantially free from branching comprising the reaction product of acid groups or hydroxyl groups and components (a), (b), (c), (d), or (e).

19. A coating composition as set forth in claim 18 wherein the wherein the reaction product comprising the grind resin has an average of less than two branches per molecule resulting from reaction of acid groups or hydroxyl groups and said dibasic acid, said polybasic acid, said diol, said polyol, or said fatty compound.

* * * * *